R. W. GRISWOLD.
GRIDDLE.
APPLICATION FILED NOV. 8, 1915.
1,204,429. Patented Nov. 14, 1916.
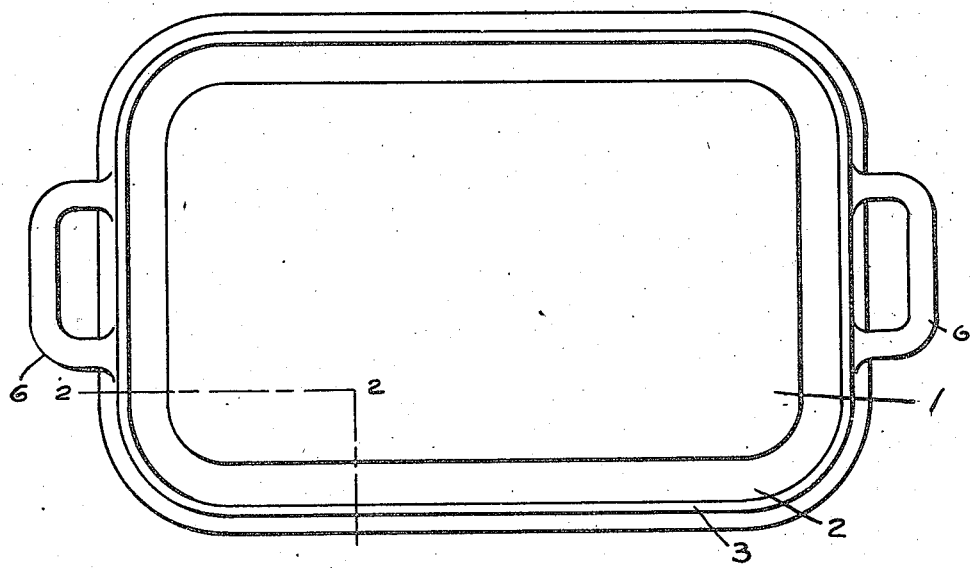
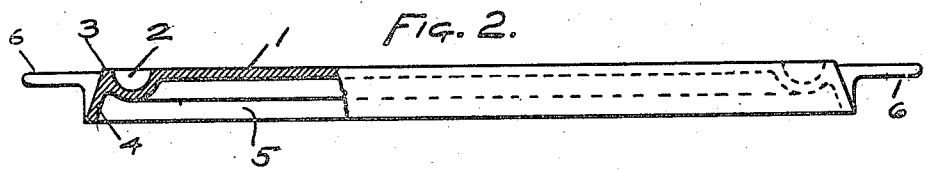
Inventor
Roger W. Griswold
By
Attorney

UNITED STATES PATENT OFFICE.

ROGER W. GRISWOLD, OF ERIE, PENNSYLVANIA, ASSIGNOR TO GRISWOLD MANUFACTURING COMPANY, OF ERIE, PENNSYLVANIA, A CORPORATION OF PENNSYLVANIA.

GRIDDLE.

1,204,429.  Specification of Letters Patent.  Patented Nov. 14, 1916.

Application filed November 8, 1915. Serial No. 60,250.

*To all whom it may concern:*

Be it known that I, ROGER W. GRISWOLD, a citizen of the United States, residing at Erie, in the county of Erie and State of Pennsylvania, have invented new and useful Improvements in Griddles, of which the following is a specification.

This invention relates to griddles and consists in certain improvements in the construction thereof as will be hereinafter fully described and pointed out in the claims.

The invention is illustrated in the accompanying drawings as follows:—

Figure 1 shows a plan view of the griddle. Fig. 2 a side elevation, partly in section, on the line 2—2 in Fig. 1.

1 marks the baking surface of the griddle, 2 a gutter surrounding the baking surface, 3 the outer wall of the gutter, 4 a wall extending downwardly from the outer wall of the gutter, 5 a chamber formed within the wall 4 to give to all parts of the griddle uniform heat and 6 handles extending from the edges of the griddle. The surface 1 of the griddle is preferably polished and this surface is at least as high as the upper edge of the wall 3. By thus arranging the surface 1 with relation to the wall 3 this upper surface readily lends itself to polishing as there is no surrounding obstruction. Thus depressing the outer wall 3 of the gutter also makes the baking surface of the griddle more readily accessible in use and more readily cleaned. The handles 6 preferably do not extend above the surface 1. So formed they do not obstruct the finishing of the surface 1 nor the ease in cleaning the baking surface or operating upon it.

What I claim as new is:—

1. A griddle having a plane baking surface; and a handle extending from the edge of the griddle, the baking surface extending in a plane above the handle.

2. A griddle having a plane baking surface; a gutter at the edge of the surface; and a handle extending from the edge of the griddle, the baking surface being at least as high as the outer wall of the gutter and the handle.

3. A griddle having a plane baking surface; a gutter surrounding the baking surface; and a handle extending from the edge of the griddle; the baking surface being at least as high as the outer wall of the gutter and the handle.

In testimony whereof I have hereunto set my hand.

ROGER W. GRISWOLD.